(12) United States Patent
Aoyama (10) Patent No.: US 10,003,225 B2
(45) Date of Patent: Jun. 19, 2018

(54) MOTOR

(71) Applicant: SUZUKI MOTOR CORPORATION, Shizuoka (JP)

(72) Inventor: Masahiro Aoyama, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 282 days.

(21) Appl. No.: 14/878,882

(22) Filed: Oct. 8, 2015

(65) Prior Publication Data

US 2016/0105062 A1    Apr. 14, 2016

(30) Foreign Application Priority Data

Oct. 14, 2014    (JP) .................................. 2014-209866

(51) Int. Cl.
*H02K 3/20*       (2006.01)
*H02K 11/04*      (2016.01)
*H02K 1/24*       (2006.01)
*H02K 19/12*      (2006.01)

(52) U.S. Cl.
CPC .............. *H02K 1/24* (2013.01); *H02K 19/12* (2013.01)

(58) Field of Classification Search
CPC ........ H02K 11/042; H02K 19/12; H02K 1/24; H02K 1/246; H02K 3/20
USPC .......................................................... 310/51
See application file for complete search history.

(56) References Cited

U.S. PATENT DOCUMENTS

| | | | | |
|---|---|---|---|---|
| 2013/0241367 A1* | 9/2013 | Taniguchi | ........... | H02K 11/0094 310/68 D |
| 2013/0334937 A1* | 12/2013 | Yamada | ................. | H02K 19/10 310/68 D |
| 2014/0028160 A1* | 1/2014 | Yamada | ................. | H02K 19/12 310/68 B |
| 2014/0285057 A1* | 9/2014 | Aoyama | ................. | H02K 3/28 310/210 |
| 2014/0300223 A1* | 10/2014 | Yamada | ................. | H02K 19/12 310/54 |
| 2015/0022035 A1* | 1/2015 | Yamada | ................. | H02K 19/12 310/54 |

FOREIGN PATENT DOCUMENTS

| | | |
|---|---|---|
| JP | 2010-22185 A | 1/2010 |
| JP | 2010-279165 A | 12/2010 |
| JP | 2013-38918 A | 2/2013 |

* cited by examiner

*Primary Examiner* — Alex W Mok
(74) *Attorney, Agent, or Firm* — Rothwell, Figg, Ernst & Manbeck, P.C.

(57) ABSTRACT

A motor 10 comprises a stator 11 including a plurality of armature pole coils 14 for generation of magnetic flux when energized; a rotor 21 mounted for rotation within the stator owing to the magnetic flux. The rotor is formed for integral rotation in the state of magnetically coupling a plurality of rotor teeth 22, each having an outer peripheral surface 22a linked by magnetic flux, and a plurality of auxiliary salient structures 32, each situated between the adjacent two rotor teeth and having an outer peripheral surface 32a linked by magnetic flux. The rotor teeth and auxiliary salient structures include induction coils 27, 37, each for generation of induced current when linked by space harmonics contained in the magnetic flux, and electromagnetic coils 28, 38, each for generation of electromagnetic force when energized by the induced current generated by the induction coil.

4 Claims, 9 Drawing Sheets

MOTOR

CROSS-REFERENCE

This document claims priority to Japanese Application Number 2014-209866, filed Oct. 14, 2014, the entire content of which is hereby incorporated by reference.

TECHNICAL FIELD

The present invention relates to a motor equipping a rotor with electromagnets having self-excitation type wound field function.

BACKGROUND ART

Motors to be installed in hybrid electric vehicles (HEVs: Hybrid Electric Vehicles) or electric vehicles (EVs: Electric Vehicles) require improved efficiency by, for example, effectively using magnet torque together with torque generated through the phenomenon of magnetic reluctance. Such motors widely use interior permanent magnet (IPM) design that varies such permanent magnets as neodymium magnets whose magnetic force is strong within the rotor structure.

With regard to motors of this kind, as seen from a motor described in JP 2013-38918A, called Patent Literature 1 below, it is proposed to equip the rotor with electromagnets having self-excitation type wound field function in view of the fact that permanent magnets with high magnetic force are expensive and difficult to get because a stable supply of magnetic material is hard to achieve. In the motor described in Patent Literature 1, an induction coil and an electromagnetic coil are individually formed around each of rotor salient structures with which magnetic flux generated by stator armature pole coils is directed to link in order to cause the rotor salient structure to function as an electromagnet by supplying rectified induced current to the electromagnetic coil after rectifying current induced by the induction coil.

In the motor described in this Patent Literature 1, torque applied to the rotor is improved by using reluctance torque that is generated by linking magnetic flux generated by stator armature pole coils with the rotor salient structures and magnet torque that is generated by causing the rotor salient structures to serve as electromagnets.

PRIOR ART

Patent Literature

Patent Literature 1: JP2013-38918A

SUMMARY OF INVENTION

Technical Problem

However, in the motor described in Patent Literature 1, since an electromagnet with self-excitation type wound field function is realized at each of rotor salient structures, each having an induction coil and an electromagnetic coil, the torque generating surface consists of only the outer peripheral surface portions of the rotor salient structures, each having the induction and electromagnetic coils winding therearound in common.

This lowers the efficiency of rotation in this motor because the outer peripheral surface of the rotor has areas with low torque in density and lowers the quality of rotation because the areas with low torque in density appear one after another in the peripheral direction.

Moreover, in the motor described in this Patent Literature 1, DC field current is synthesized after each AC induced current generated by the induction coil is half-wave rectified per pole salient structure, so the induced current cannot be effectively used.

Accordingly, an object of the present invention is to provide a motor, equipped with electromagnets having self-excitation type wound field function, capable of providing high torque drive by more efficiently recovering lost energy as field energy.

Solution to Problem

In order to solve the above-mentioned problem, a motor according to one aspect of the present invention comprises: a stator including a plurality of armature pole coils for generation of magnetic flux when energized; a rotor mounted for rotation within the stator owing to the magnetic flux, the rotor being formed with a plurality of main salient structures, which are directed toward the stator and distant one after another in a predetermined direction, and a plurality of auxiliary salient structures, which are directed toward the stator and distant one after another in the predetermined direction in a way that each of the plurality of auxiliary salient structures is situated between the adjacent two of the plurality of main salient structures, the plurality of main and auxiliary salient structures including induction coils, each for generation of induced current when linked by space harmonics contained in the magnetic flux, and electromagnetic coils, each for generation of electromagnetic force when energized by the induced current generated by the induction coil.

Advantageous Effects of Invention

According to this aspect of the present invention, there is provided a motor, equipped with electromagnets having self-excitation type wound field function, capable of providing high torque drive by efficiently recovering lost energy as field energy.

DESCRIPTION OF EMBODIMENTS

Figure 1:
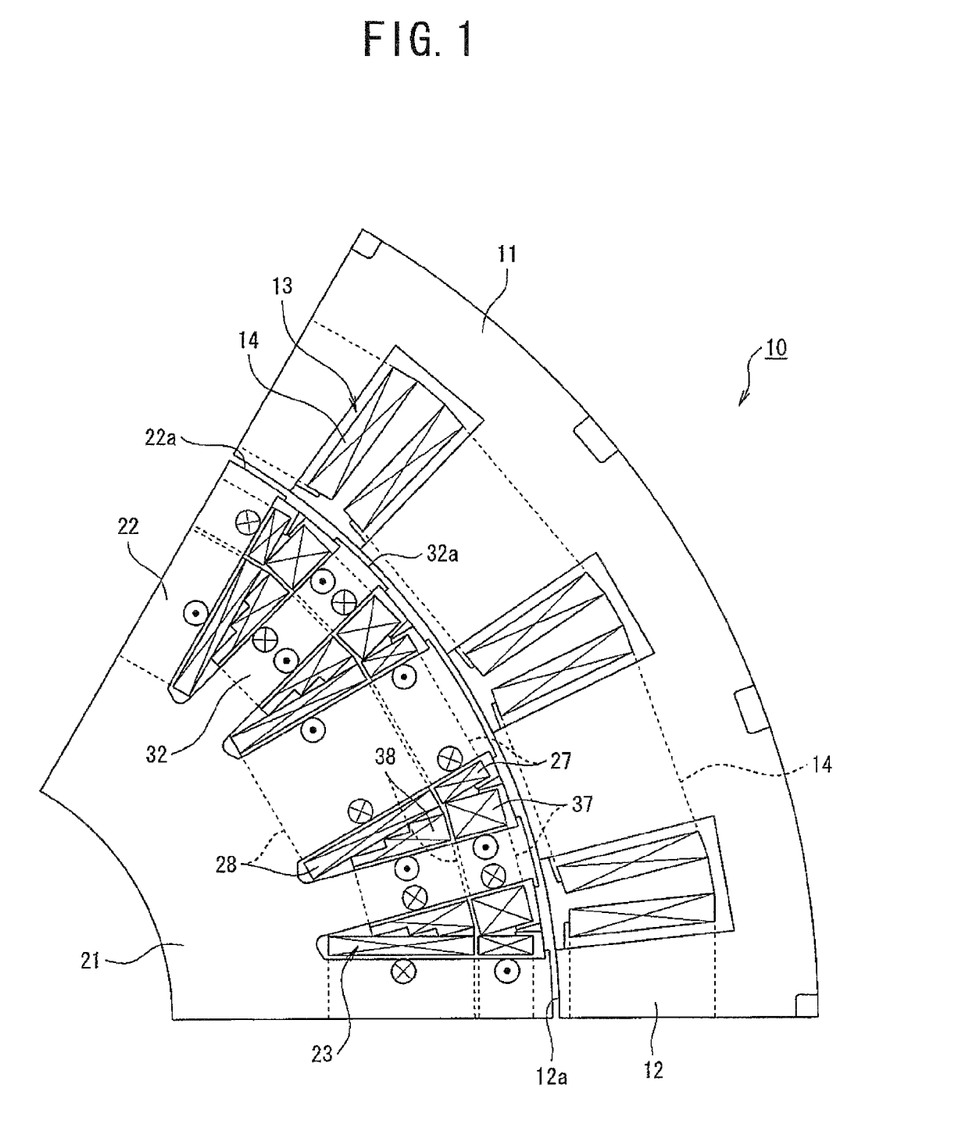
FIG. 1 is a view of one embodiment of a motor according to the present invention, i.e. a magnified fragmentary cross-section of its schematic configuration.

Referring to the accompanying drawings, an embodiment of the present invention is described in detail below. FIGS. 1 through 9 are views showing a motor pertaining to one embodiment of the present invention. Here, FIG. 1 is a cross-section of a reluctance motor, showing only a portion having 60 degrees, in mechanical angle, of arc with an axis of rotation as a center, indicating a structure in which the portion having 60 degrees, in mechanical angle, is periodically repeated in peripheral direction.

(Basic Structure of Motor)

In FIG. 1, a motor 10 has a performance suitable for mounting on a vehicle, such as, an electric vehicle or a hybrid electric vehicle, for example, as a sole driving source or as a driving source together with an internal combustion engine. This motor 10 is formed in a structure that does not require any energy input to a rotor from the outside, as described later.

The motor 10 includes a stator 11 formed in a nearly cylindrical shape and a rotor 21 mounted for rotation within stator 11 and fixed to a rotating shaft aligned with the axis of rotation. Stator 11 and rotor 21 function as magnetic paths capable of passing enhanced magnetic flux by enhancing internal magnetic permeability by integrally forming them as structures which enable windings to wrap around by stacking magnetic steel sheets (magnetic bodies), respectively. These stator 11 and rotor 21 are formed in a way that magnetic flux is made to interlink the end surfaces radially facing each other across an extremely small air gap G.

Stator 11 has a plurality of stator teeth 12 arranged equidistant along a circumferential direction and formed in salient configurations radially extending in an inward direction toward the rotating shaft. On the sides of their inner peripheral surfaces 12a, stator teeth 12 are made to face, across air gap G, outer peripheral surfaces 22a of rotor teeth 22, which are described later, of rotor 21. The three-phase windings for three-phase alternating power sources are independently wrapped around respective stator teeth 12 by concentrated winding using stator slots 13, each being a space formed between sides of the adjacent two of stator teeth 12, to form armature pole coils 14. Moreover, in response to input of alternating drive current to armature pole coils 14, stator teeth 12 function as electromagnets which generate magnetic flux applying torque for rotation to rotor 21 received inward.

Rotor 21 has a plurality of rotor teeth (main salient structures) 22 arranged equidistant along a circumferential direction and formed in salient configurations radially extending in a direction away from the rotating shaft. Rotor teeth 22 differ, in number over the entire circumference, from stator teeth 12 and are formed in a way that, during relative rotation, outer peripheral surfaces (end surfaces) 22a timely come to face inner peripheral surfaces 12a of stator teeth 12.

This arrangement enables motor 10 to allow magnetic flux generated by energizing armature pole coils 14 of stator 11 to run from inner peripheral surfaces 12a of stator teeth 12 to interlink the facing outer peripheral surfaces 22a of rotor teeth 22. Thus, motor 10 can cause rotor 21 to relatively spin owing to reluctance torque (main torque) generated to provide the least magnetic path (magnetic coupling) though which magnetic flux runs. As a result, in motor 10, electrical energy input by energization is outputted as mechanical energy from the rotating shaft integrally rotatable with rotor 21 relatively rotating within stator 11.

(Basic Structure of Self-Excitation Type Wound Field Motor)

In this motor 10, the magnetic flux which links with outer peripheral surfaces 22a of rotor teeth 22 from inner peripheral surfaces 12a of stator teeth 12 contains space harmonics. This makes it possible for rotor 21 to obtain electromagnetic force by causing built-in coils to generate induced current by using a variation in magnetic flux density of each of space harmonics linking with rotor 21 from stator 11.

Specifically, during this time, since, with alternating driving power varying at a fundamental frequency supplied to armature pole coils 14 of stator 11, rotor 21 (rotor teeth 22) is caused to spin by main magnetic flux varying at the fundamental frequency, there are no much changes in the magnetic flux linking rotor 21 and no induced current is generated even if coils are simply arranged on rotor 21.

On the other, varying at frequencies, with respect to time, different from the fundamental frequency, the space harmonics superimposed on magnetic flux link with rotor teeth 22 from outer periphery surfaces 22a. Thus, the space harmonics superimposed on the magnetic flux with the fundamental frequency can cause coils which are installed on rotor teeth 22 near outer peripheral surfaces 22a to effectively generate induced current. As a result, it is possible to recover the space harmonic magnetic flux that is the cause of occurrence of iron loss as energy for self-excitation.

It follows from this that motor 10 has an induction coil 27 and an electromagnetic coil 28 arranged on each of its rotor teeth 22 by wrapping windings around the rotor tooth 22 by concentrated winding using rotor slots 23, each being a space formed between sides of the adjacent two of rotor teeth 22. Moreover, motor 10 has auxiliary salient structures 32, later described, each being formed within one of rotor slots 23, and it has an induction coil 37 and an electromagnetic coil 38 arranged on each of auxiliary salient structures 32 by wrapping windings around the auxiliary salient structure 32 as much as wrapping windings around the rotor tooth 22.

Induction coils 27, 37 are caused to generate induced currents to be supplied to the respective electromagnetic coils 28, 38 by space harmonics (or variations in magnetic flux density) contained in magnetic flux that links with outer peripheral surfaces 22a, 32a of rotor teeth 22 and auxiliary salient structures 32 from inner peripheral surfaces 12a of stator teeth 12. Electromagnetic coils 28, 38 are self-excited by using, as field currents, the induced currents supplied by the associated induction coils 27, 37 to generate magnetic flux (electromagnetic force).

Thus, motor 10 makes it possible to cause the magnetic flux, which is generated by electromagnetic coils 28, 38 in response to induced currents induced by induction coils 27, 37, to link with inner peripheral surfaces 12a of the adjacent stator teeth 12 from outer peripheral surfaces 22a, 32a of rotor teeth 22 and auxiliary salient structures 32. This provides a torque assist to relative rotation of rotor 21 by obtaining magnet torque (or auxiliary torque) generated based on the tendency for magnetic flux links to seek the magnetic path of least resistance in addition to the magnetic flux of armature pole coils 14 causing generation of main torque.

As a result, motor 10 makes it possible to recover, as energy, space harmonics included in magnetic flux, which are not used in the case of only rotor teeth 22 and thus become the cause of loss, even at auxiliary salient structures 32 to provide, as an output, the recovered energy, and to reduce torque ripple by causing driving force to generate at each areas where rotor slots 23 are formed.

Describing in details, a plurality of auxiliary salient structures 32 magnetically coupled to rotor teeth 22 are integrally rotatable with rotor 21 in a way that the auxiliary salient structures 32 are formed in salient configurations radially extending in directions away from the rotating shaft as with rotor teeth 22, equidistant in a circumferential direction, and situated within the respective rotor slots 23. In other words, the auxiliary salient structures 32 as many as rotor teeth 22 are provided and are formed in a way that, during relative rotation, outer peripheral surfaces 32a timely come to face inner peripheral surfaces 12a of stator teeth 12.

(Detailed Structure of Self-Excitation Type Wound Field Motor 1)

Figure 4:
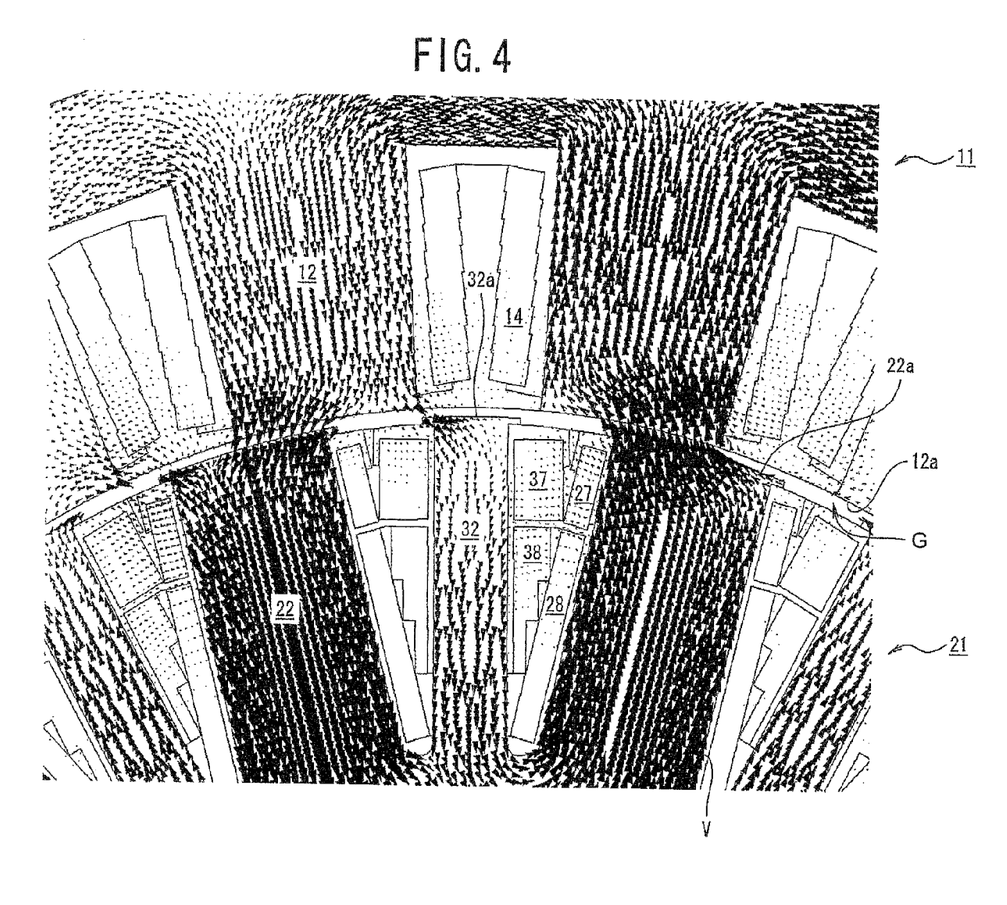
FIG. 4 is a state diagram showing magnetic flux vectors drawn according to directions of magnetization of magnetic flux generated during energization.
Figure 5:
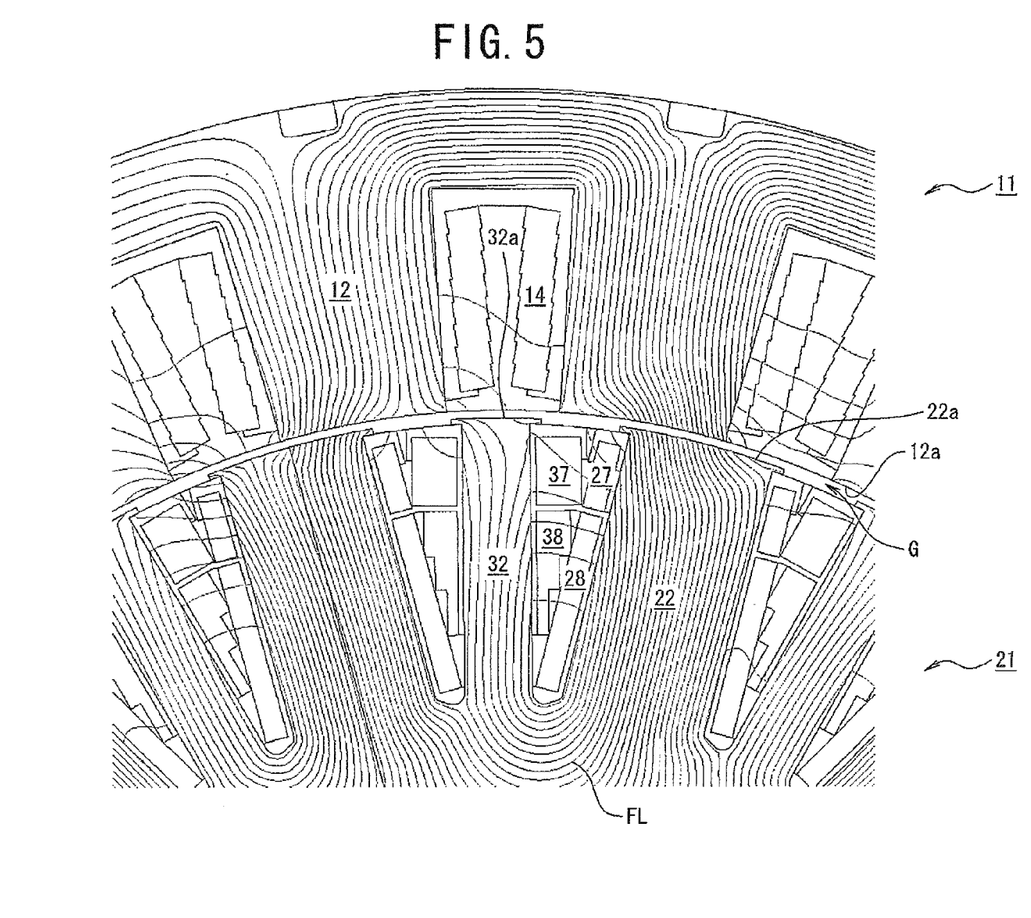
FIG. 5 is a state diagram showing magnetic flux lines drawn according to magnetic flux generated during energization.

Referring to FIGS. 4 and 5, in order to make rotor teeth 22 serve as electromagnets, in addition to arranging electromagnetic coils 28, this motor 10 arranges, as a power source of field current to be supplied to the electromagnetic coils 28, induction coils 37 on auxiliary salient structures 32 distinct from rotor teeth 22. Electromagnetic coil 28 is formed around each of rotor teeth 22 at a portion on the rotating shaft side remote from outer peripheral surface 22a by concentrated winding, while induction coil 37 is formed around the adjacent one of auxiliary salient structures 32 at a portion on the side adjacent to outer peripheral surface 32a by concentrated winding.

This allows motor 10 to cause magnetic flux to densely link with outer peripheral surface 32a of the auxiliary salient structure 32 from inner peripheral surface 12a of the adjacent stator tooth 12 via a small air gap G, causing induction coil 37 to generate induced current depending on space harmonics (or variation in magnetic flux density) contained in the linking magnetic flux to supply the induced current to electromagnetic coil 28 around the rotor tooth 22. Electromagnetic coil 28 on this rotor tooth 22 can generate magnetic flux (or electromagnetic force) by self-excitation using, as field current, the induced current received from induction coil 37 on the auxiliary salient structure 32.

Therefore, motor 10 makes it possible to cause, with induced current by induced coil 37 on auxiliary salient structure 32, electromagnetic coil 28 on the distinct rotor tooth 22 to generate magnetic flux, causing the magnetic flux to run out of outer peripheral surface 22a of this rotor tooth 22 to link with inner peripheral surface 12a of the adjacent stator tooth 12.

This means that motor 10 can assist rotation of rotor 21 by making electromagnetic coil 28 serve as an electromagnet with supply of power from induction coil 37 on auxiliary salient structure 32 situated within rotor slot 23, driving rotation with rotor teeth 22 as d-axes and auxiliary salient structure 32 between the rotor teeth 22 as a q-axis.

(Detailed Structure of Self-Excitation Type Wound Field Motor 2)

Figure 6:
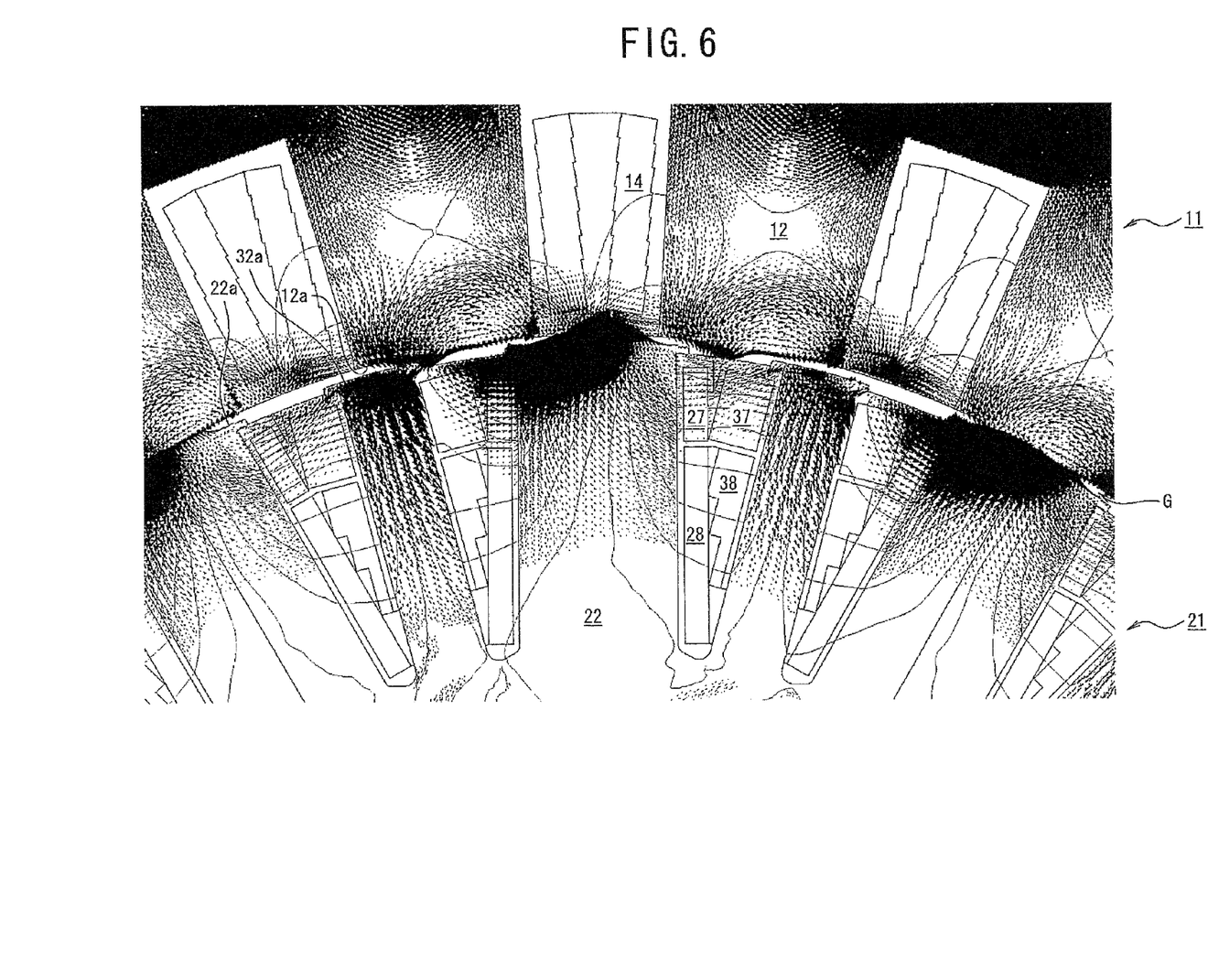
FIG. 6 is a state diagram showing magnetic flux generated during energization with magnetic flux lines and magnetic flux vectors.

Moreover, referring to FIG. 6, in order to make auxiliary salient structures 32 serve as electromagnets, in addition to arranging electromagnetic coils 38, this motor 10 arranges, as a power source of field current to be supplied to the electromagnetic coils 38, induction coil 27 on rotor tooth 22 distinct from auxiliary salient structures 32. Electromagnetic coil 38 is formed around each of auxiliary salient structures 32 at a portion on the rotating shaft side remote from outer peripheral surface 32a by concentrated winding, while induction coil 27 is formed around the adjacent one of rotor teeth 22 at a portion on the side adjacent to outer peripheral surface 22a by concentrated winding.

This allows motor 10 to cause magnetic flux to densely link with outer peripheral surface 22a of the rotor tooth 22 from inner peripheral surface 12a of the adjacent stator tooth 12 via a small air gap G, causing induction coil 27 to generate induced current depending on space harmonics contained in the linking magnetic flux to supply the induced current to electromagnetic coil 38 around the auxiliary salient structure 32. Electromagnetic coil 28 on this auxiliary salient structure 32 can generate magnetic flux (or electromagnetic force) by self-excitation using, as field current, the induced current received from induction coil 27 on the rotor tooth 22.

Therefore, motor 10 makes it possible to cause, with induced current by induced coil 27 on rotor tooth 22, electromagnetic coil 38 on the distinct auxiliary salient structure 32 to generate magnetic flux, causing the magnetic flux to run out of outer peripheral surface 32a of this auxiliary salient structure 32 to link with inner peripheral surface 12a of the adjacent stator tooth 12.

This means that motor 10 can assist rotation of rotor 21 by making electromagnetic coil 38 on auxiliary salient structure 32 situated within rotor slot 23 serve as an electromagnet with supply of power from induction coil 27 on rotor tooth 22.

(Circuit Structure of Self-Excitation Type Wound Field Motor 1)

Now, in order to efficiently generate induced current, these induction coils 27, 37 and electromagnetic coils 28, 38 are installed after rigorously identifying the magnetic paths of space harmonics by carrying out a magnetic analysis so as to make efficient use of $3^{rd}$ space harmonic contained in magnetic flux that links with outer peripheral surfaces 22a, 32a of rotor teeth 22 and auxiliary salient structures 32 from inner peripheral surfaces 12a of stator teeth 12.

Moreover, motor 10 may be reduced in overall size by using concentrated winding structure with regard to the installation of induction coils 27, 37 and magnetic coils 28, 38 because they do not need to wind rotor 21 spanning more than one rotor slot in a circumferential direction. Additionally, the quantity of recoverable lost energy may be increased by efficiently generating induction current from the interlinkage of low-order $3^{rd}$ space harmonic magnetic flux while, with regard to induction coils 27, 37, lowering copper loss in primary-side.

Furthermore, using $3^{rd}$ space harmonic with regard to induction coils 27, 37 rather than using $2^{nd}$ space harmonic will effectively generate induction current. Describing in details, lost energy may be efficiently recovered because use of $3^{rd}$ space harmonic rather than $2^{nd}$ space harmonic causes an increase in time variation of magnetic flux which causes an increase in the amplitude of induction current.

Figure 2:
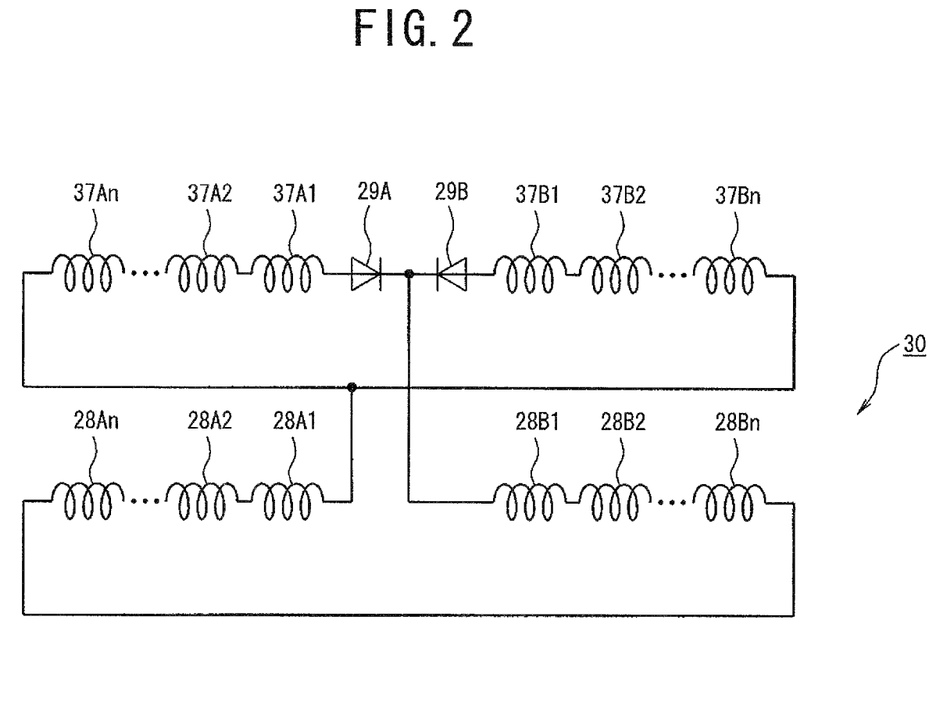
FIG. 2 is a diagram of a simplified circuit configuration for connecting induction coils on auxiliary salient structures to electromagnetic coils on rotor teeth via diodes.
Figure 3:
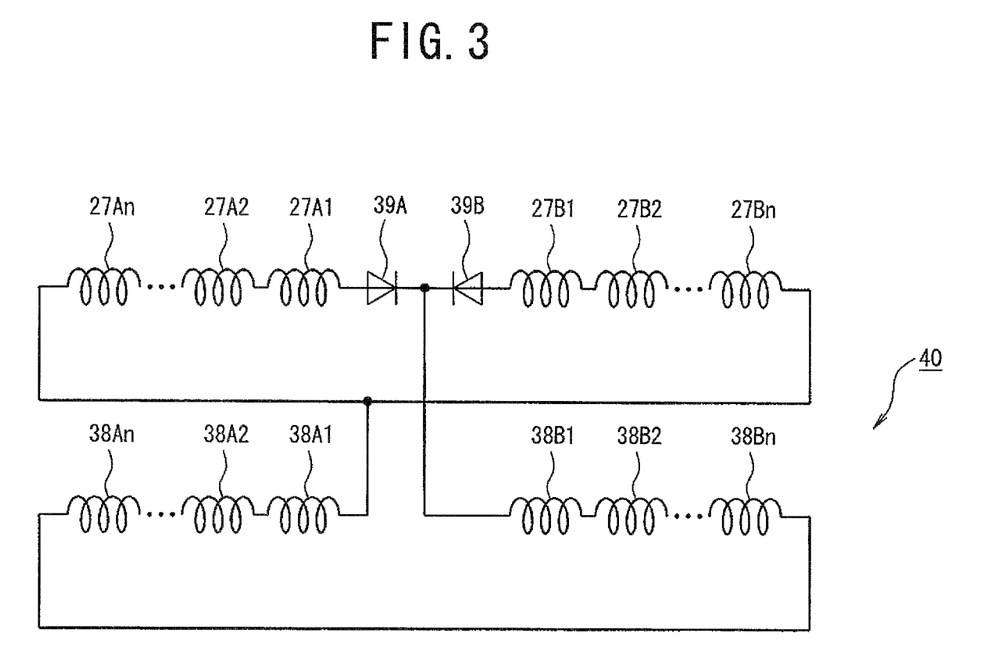
FIG. 3 is a diagram of a simplified circuit configuration for connecting induction coils on the rotor teeth to electromagnetic coils on the auxiliary salient structures via diodes.

Since rotor teeth 22 and auxiliary salient structures 32 are made to serve as electromagnets to generate electromagnetic force in response to an input of DC field current converted from AC induced current generated owing to space harmonics contained in linking magnetic flux that is produced by armature pole coils 14 during receiving power supply from an AC power, induction coils 27, 37, and electromagnetic coils 28, 38 are incorporated into rectifier circuits 30, 40 shown in FIGS. 2 and 3 to effectively use the above-mentioned AC induced current.

Specifically, there are provided induction coils 27 which are formed by winding around rotor teeth 22 in the same direction of winding. Similarly, there are provided induction coils 37 which are formed by winding around auxiliary salient structures 32 in the same direction of winding. These induction coils 27, 37 have the same direction of winding.

There are provided electromagnetic coils 28 which are formed by winding around rotor teeth 22 distant one after another in the circumferential direction such that the direction of winding is reversed every other pole. Similarly, there are provided electromagnetic coils 38 which are formed by winding around auxiliary salient structures 32 distant one after another in the circumferential direction such that the direction of winding is reversed every other pole. These electromagnetic coils 28, 38 are formed such that, with respect to rotor teeth 22 or auxiliary salient structures 32, the direction of winding of each of the electromagnetic coils 28, 38 becomes the same as or the opposite to the direction of winding of the radially adjacent one of induction coils 27, 37 every other pole.

As readily seen from FIG. 2, both ends of a set of electromagnetic coils 28, which are on rotor teeth 22 and wholly connected in series, are connected to both ends of a parallel connections, made by induction coils 37 on auxiliary salient structures 32, via diodes (rectifiers) 29A, 29B. Describing in details, the electromagnetic coils which are wound in one direction, i.e., 28A1~28An, are wholly connected in series, and the electromagnetic coils which are wound in the opposite direction, i.e., 28B1~28Bn, are wholly connected in series, where n: (number of poles)/2, and they are connected to the both ends of the parallel connections, i.e., one connection including the mating induction coils 37A1~37An, which are connected in series, to magnetic coils 28A1~28An, the other connection including the mating induction coils 37B1~37Bn, which are connected in series, to magnetic coils 28B1~28Bn, in a parallel relationship.

Similarly, as readily seen from FIG. 3, both ends of a set of electromagnetic coils 38, which are on rotor teeth 32 and wholly connected in series, are connected to both ends of parallel connections, made by induction coils 27 on rotor teeth 22, via diodes (rectifiers) 39A, 39B. Describing in details, the electromagnetic coils which are wound in one direction, i.e., 38A1~38An, are wholly connected in series, and the electromagnetic coils which are wound in the opposite direction, i.e., 38B1~38Bn, are wholly connected in series, where n: (number of poles)/2, and they are connected to the both ends of the parallel connections, i.e., one connection including the mating induction coils 27A1~37An, which are connected in series, to magnetic coils 38A1~28An, the other connection including the mating induction coils 27B1~27Bn, which are connected in series, to magnetic coils 38B1~38Bn, in a parallel relationship.

With regard to the number of diodes 29A, 29B, 39A, 39B, in case an increase in the number of poles is required, wholly connecting electromagnetic coils 28 and electromagnetic coils 37 in series for rotor teeth 22 and auxiliary salient structures 32, respectively, work to restrain the number of diodes to be used. In order to avoid use of a large number of diodes, these pairs of diodes 29A, 29B and 39A, 39B are connected to form not such prevailing H bridge type full-wave rectifier circuits but neutral point clamp half-wave rectifier circuits 30, 40 by connecting elements so as to provide a phase difference of 180 degrees between one input induction current to one of each pair of diodes 29A, 29B or 39A, 39B and the other input induction current to the other of the pair for providing an output by carrying out full-wave rectification, i.e. carrying out half-wave rectification after inverting the one induction current.

In other words, diodes 29A, 29B are incorporated in a rectifier circuit or a first rectifier circuit 30 including a plurality of induction coils 37 and a plurality of electromagnetic coils 28 connected so as to carry out rectification. Diodes 39A, 39B are incorporated in another rectifier circuit or a second rectifier circuit 40 including a plurality of induction coils 27 and a plurality of electromagnetic coils 38 connected so as to carry out rectification. It follows that the diodes 29A, 29B and diodes 39A, 39B are incorporated into respective electrically independent rectifier circuits 30, 40, each for carrying out full-wave rectification of induced current.

This allows motor 10 to supply AC induced currents generated by induction coils 37 and induction coils 27 to electromagnetic coils 28 which are connected in series and electromagnetic coils 38 which are connected in series after combining DC field currents given by adjustment of full-wave rectifications of the AC induced currents via diodes 29A, 29B and diodes 39A, 39B of distinct rectifier circuits 30, 40. For this reason, it is possible, in motor 10, to produce a strong magnetic flux (magnetic force) through effective self-excitation of electromagnetic coils 28, 38 caused by DC field currents combined for each of magnetic coils 28, 38.

In this manner, motor 10 can make electromagnetic coils 38 to serve as electromagnets by supplying DC field current, which is produced through full-wave rectification by rectifier circuit 40 of induced current generated by induction coils 27 on rotor teeth 22, to electromagnetic coils 38 on auxiliary salient structures 32. In other words, this motor 10 can make auxiliary salient structures 32 to serve as electromagnets by utilizing armature reaction, which is recognized as a loss in case forming an induction coil and an electromagnetic coil on each of rotor teeth 22.

Moreover, core members 132 of a later described motor 100 shown in FIG. 7 go no further than generation of induced current at magnetically shielded induction coils 137 and cannot cause generation of torque. In contrast, motor 10 arranges not only induction coils 37, but also induction coils 27 and electromagnetic coils 38. This makes it possible for motor 10 to add, as torque generating surface, outer peripheral surfaces 32a of auxiliary salient structures 32 to outer peripheral surfaces 22a of rotor teeth 22 without any copper loss derived from an increase in resistance value as in a case connecting electromagnetic coils 28, 38 to each of induction coils 37 in series or without any reduction in field current owing to occurrence of circulating current as in a case connecting electromagnetic coils 28, 38 to each of induction coils 37 in parallel.

Consequently, by forming auxiliary salient structures 32 within respective rotor slots 23 in addition to rotor teeth 22, motor 10 can arrange induction coils 27, 37 and electromagnetic coils 28, 38 in a way that they are divided into coils for excitation and coils for electromagnet and made independent. This makes it possible to provide an output as a torque whose variation with time is suppressed in response to field current given by full-wave rectification of induction current by avoiding destructive interference and expanding the area of torque generating surface, i.e. outer peripheral surfaces 22a, 32a.

Moreover, induction coils 27, 37 and electromagnetic coils 28, 38 are arranged in a plurality of places distant one after another in a circumferential direction of rotor 21 for an increase in pole. For this reason, it is possible to disperse the amount of magnetic flux that links per tooth in both of each of rotor teeth 22 and the adjacent one of auxiliary salient structures in the circumferential direction to reduce operation noise by suppressing electromagnetic vibration caused by dispersing also electromagnetic force, acting on rotor teeth 22 and auxiliary salient structures 32, into the circumferential direction.

(Circuit Structure of Self-Excitation Type Wound Field Motor 2)

Moreover, in this rotor 21, electromagnetic coils 28 on rotor teeth 22 are made to generate electromagnetic force by supplying DC field current, which is produced through full-wave rectification by diodes 29A, 29B of induced current generated by induction coils 37 on auxiliary salient structures 32. The electromagnetic coils 28 are formed such that the direction of winding is reversed every other pole of rotor teeth 22. It follows that rotor 21 makes electromagnetic coils 28 to serve as electromagnets whose magnetization directions are reversed alternately between the adjacent two of the electromagnets in the circumferential direction as indicated by magnetic vectors V in FIG. 4, and forms a magnetic path running around each of rotor slots 23 for smoothly passing therethrough magnetic flux in response to the magnetization directions of the adjacent two of rotor teeth 22 as indicated by magnetic flux lines FL in FIG. 5.

Furthermore, electromagnetic coils 38 on auxiliary salient structures 32 are made to generate electromagnetic force by supplying DC field current, which is produced through full-wave rectification by diodes 39A, 39B of induced current generated by induction coils 27 on rotor teeth 22. The electromagnetic coils 38 are formed such that the direction of winding is reversed every other pole of auxiliary salient structures 32. It follows that rotor 21 makes electromagnetic coils 38 to serve as electromagnets whose magnetization directions are reversed alternately between the adjacent two of the electromagnets in the circumferential direction as indicated by magnetic vectors V in FIG. 4, and forms a magnetic path running around each of rotor slots 23 for smoothly passing therethrough magnetic flux in response to the magnetization directions of the adjacent two of auxiliary salient structures 32 as indicated by magnetic flux lines FL in FIG. 5.

Each of electromagnetic coils 38 is formed adjoining electromagnetic coils 28 on the adjacent rotor teeth 22 such that its magnetization direction aligns with a radial direction of rotor 21 and set such that its direction of winding is reversed alternately in the circumferential direction.

This makes the electromagnetic coil 38 on auxiliary salient structure 32 to serve as a magnetic shield restricting the magnetic flux entering auxiliary salient structure 32 when the magnetization direction is directed toward the rotating shaft, thus having a function to allow magnetic flux generated by electromagnetic coil 28 to preferentially select a magnetic path through each of the rotor teeth 22.

In addition, magnetic flux generated by electromagnetic coil 38, whose direction is directed against the direction of armature magnetic flux, causes generation of armature reaction. On the other hand, magnetic flux generated by electromagnetic coil 28 becomes the same, in direction, as armature magnetic flux, thus serving as a magnet torque (electromagnet torque).

Moreover, in case magnetization direction is directed toward the rotating shaft when an electromagnetic coil 28 on a rotor tooth 22 is magnetized, the electromagnetic coil 28 actively forms a magnetic path directed toward the rotating shaft from the inside of the rotor tooth 22. In case magnetization direction is directed toward stator 11 when another electromagnetic coil 28 on another rotor tooth 22 is magnetized, this electromagnetic coil 28 actively forms a magnetic path directed toward the adjacent stator tooth 12 from the inside of the rotor tooth 22.

Similarly, in case magnetization direction is directed toward the rotating shaft when an electromagnetic coil 38 on an auxiliary salient structure 32 is magnetized, the electromagnetic coil 38 actively forms a magnetic path directed toward the rotating shaft from the inside of the auxiliary salient structure 32. In case magnetization direction is directed toward stator 11 when another electromagnetic coil 38 on another auxiliary salient structure 32 is magnetized, the electromagnetic coil 38 actively forms a magnetic path directed toward the adjacent stator tooth 12 from the inside of the auxiliary salient structure 32.

Therefore, electromagnetic coils 28 and 38 may work to form a magnetic circuit running through stator 11 and rotor 21 across air gap G.

In case magnetic fluxes of electromagnetic coils 28, 38 are directed toward peripheral surfaces 22a, 32a of rotor tooth 22 and auxiliary salient structure 32, it is possible to form a magnetic circuit to put a DC component of magnetic flux, within a magnetic path including stator teeth 12, that tends to link rotor 21 from stator 11 to advance toward the rotating shaft of rotor 21 back toward stator 11 to be put to use as a reluctance torque effectively assisting rotation of rotor 21 by being combined into magnetic flux directed in the tangential direction to rotor 21. Furthermore, in this case, DC components of magnetic fluxes of electromagnetic coils 28, 38, linking stator 11 from rotor 21 to form a magnetic circuit around stator slots 13, serve as a magnet torque by a later described magnetic circuit.

Moreover, in case magnetic fluxes of electromagnetic coils 28, 38 are directed toward the rotating shaft from rotor teeth 22 and auxiliary salient structures 32, it is possible to form a magnetic circuit to actively direct DC components of magnetic flux within a magnetic path including stator teeth 12 toward the rotating shaft of rotor 21 from stator 11 to be put to use as a magnet torque effectively assisting rotation of rotor 21.

Induction coils 27, 27 and electromagnetic coils 28, 38 are distributed such that a combination of each of placement positions suitable for generation of induced current with the mating one of placement positions suitable for serving as an electromagnet when the induced current is supplied as field current is separated between one of rotor teeth 22 and the adjacent one of auxiliary salient structures 32. In other words, an induction coil 37 and an electromagnetic coil 28 of one set and an induction coil 27 and an electromagnetic coil 38 of another set are placed on each of rotor teeth 22 and the adjacent one of auxiliary salient structures 32. This reduces magnetic interference between the rotor tooth 22 and auxiliary salient structure 32 and magnetic saturation and makes it possible to efficiently generate induction current and effectively generate magnetic flux by causing electromagnetic coils 28, 38 to serve as electromagnets.

Moreover, with regard to induction coils 27, 37, AC magnetic flux for causing generation of induced current runs inside of one of rotor teeth 22 or inside of the adjacent auxiliary salient structure 32, and, with regard to electromagnetic coils 28, 38, DC magnetic flux that is generated based on field current runs inside of the rotor tooth 22 or inside of the adjacent salient structure 32. Since the AC magnetic flux and DC magnetic flux have different characteristics and seldom interfere with each other, the magnetic fluxes generated by electromagnetic coils 28, 38 are not restricted by the magnetic fluxes generated by induction coils 27, 37 unless magnetic saturation occurs. For this reason, the magnetic flux generated by each of electromagnetic coils 28, 38 can serve as a magnet torque to effectively assist rotation of rotor 21 because the magnetic flux link, without any restriction, outer peripheral surfaces 22a, 32a of rotor teeth 22 and auxiliary salient structures 32 and inner surfaces 12a of stator teeth 12.

As indicated by magnetic flux vectors of $3^{rd}$ space harmonic and its magnetic flux diagram shown in FIG. 6, motor 10 can allow magnetic flux to effectively link between stator 11 and rotor 21 by effectively using outer peripheral surfaces 22a, 32a of rotor teeth 22 and auxiliary salient structures 32. In this manner, motor 10 can smoothly and efficiently spin rotor 21 with pulsation suppressed because the area of torque generating surface is increased and dispersed by making it of outer peripheral surfaces 22a, 32a of rotor teeth 22 and auxiliary salient structures 32.

(Characteristic Comparison According to Presence/Absence of Auxiliary Salient Structure)

It is thought to install self-excitation electromagnets in a reluctance motor for the purpose of improving torque and quality of rotation.

Figure 7:
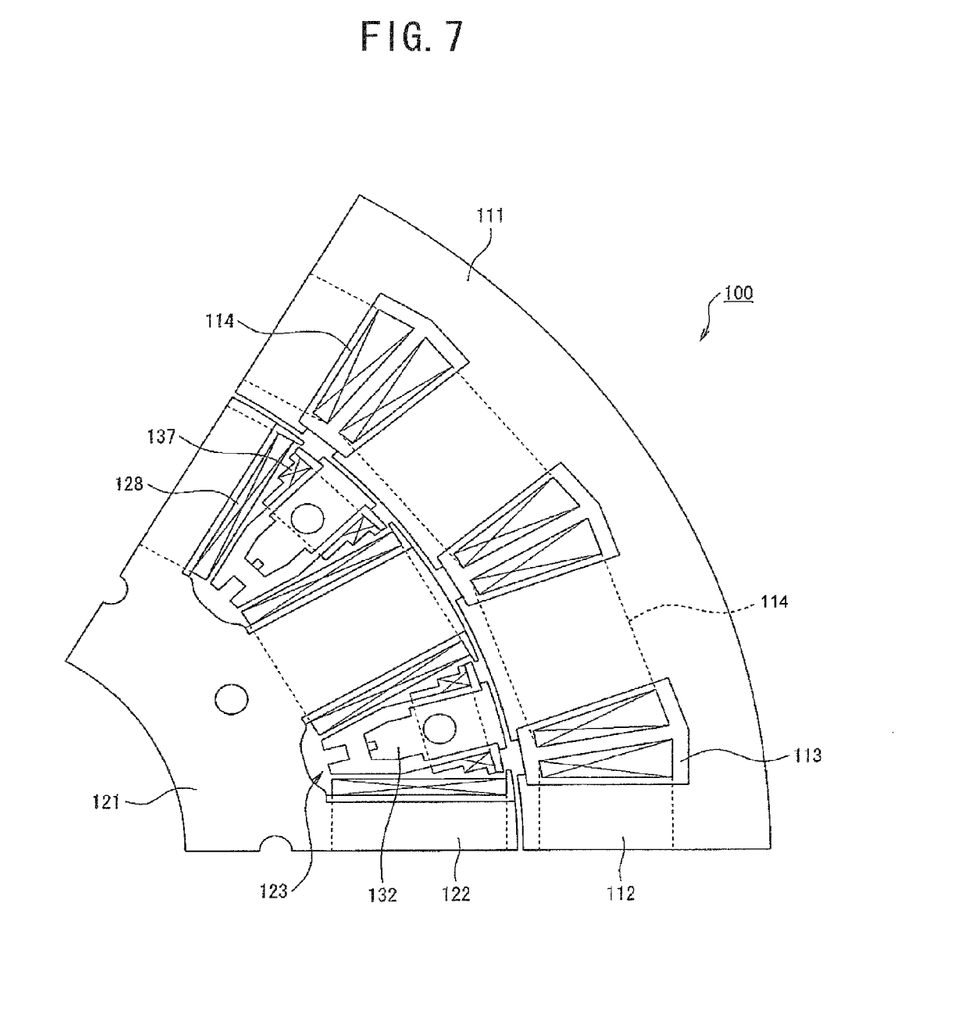
FIG. 7 is a magnified fragmentary cross-section of schematic configuration of a motor with a comparative configuration, with respect to the present embodiment, without auxiliary salient structures.

For example, a motor 100 shown in FIG. 7 is formed by winding armature pole coils 114 around stator teeth 112 of a stator 111 using stator slots 113, and by winding electromagnetic coils 128 around rotor teeth 122 of a rotor 121 using rotor slots 123.

Additionally, motor 100 is formed by winding induction coils 137 around core members 132 that are situated, in magnetically shielding state, within rotor slots 123 of rotor 121, where induction coils 137 and electromagnetic coils 123 are connected via diodes (not shown) as with motor 10 and incorporated into a full-wave rectifier circuit.

With this structure, in motor 100, additionally to a mere reluctance torque configuration without use of magnet torque, the quality of torque and rotation is improved by magnet torque by rectifying induced current generated at induction coil 137 without any need of external power to supply the rectified current, as DC field current, to electromagnetic coil 128 to make it to serve as a self-exciting electromagnet.

On the other hand, in motor 10, the quality of torque and rotation is more improved by providing auxiliary salient structures 32 within rotor slots 23, it is made possible to provide induction coils 27 and electromagnetic coils 38 in addition to providing induction coils 37 as with induction coils 137 in motor 100.

Figure 8:
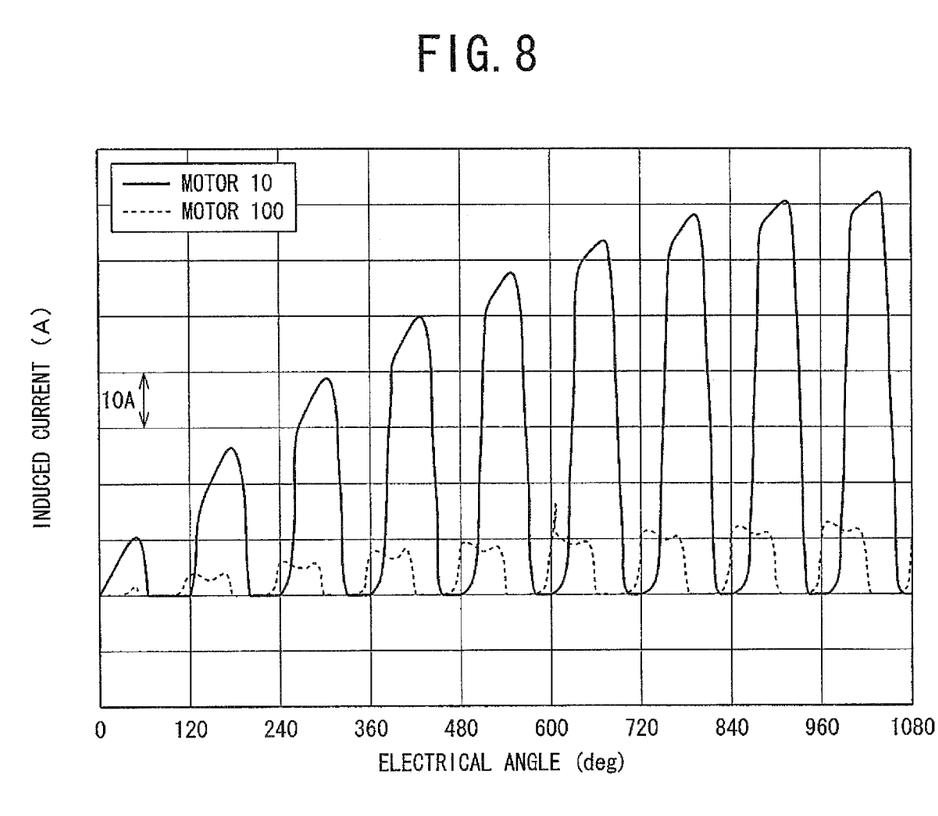
FIG. 8 is a graph for comparing induced current during energization by presence/absence of auxiliary salient structures.

From comparison based on forward induced current generated based on magnetic flux of space harmonic, when, for example, the steady rotation speed is reached, as indicated in FIG. 8, it will be understood that, since the amount of magnetic flux running within motor 10 is increased, motor 10 has several times as much the amount of electric current of induced current as motor 100.

Figure 9:
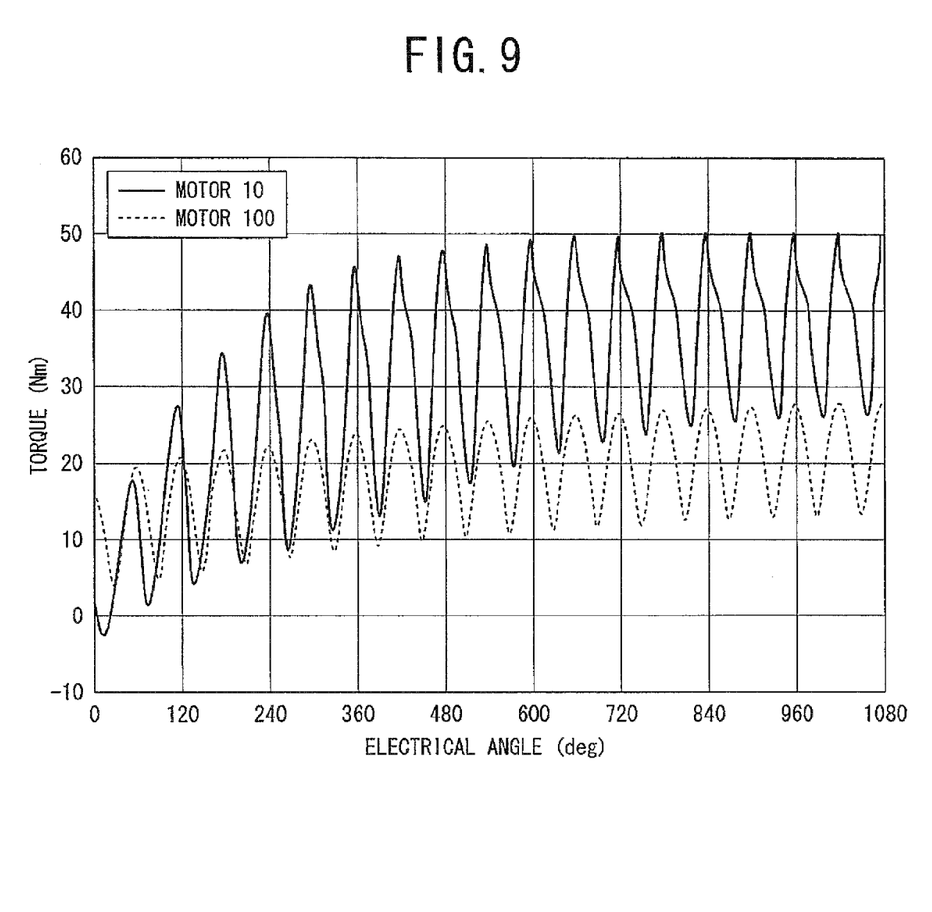
FIG. 9 is a graph for comparing torque produced during energization by presence/absence of auxiliary salient structures.

Moreover, similarly, when the steady rotation speed is reached, as indicated, for example, in FIG. 9, it will be understood that motor 10 has improved average torque more than motor 100 by more than about 70%.

(Salient Structure of Motor 10)

Motor 10 is fabricated to use mainly $3f^{th}$ space harmonic magnetic flux (f=1, 2, 3 . . . ) to use a ratio P/S=2/3, where P is the number of salient structures (rotor teeth 22), and S is the number of stator slots 13. For example, $3^{rd}$ space harmonic magnetic flux is higher, in frequency, than the fundamental that is inputted to armature pole coils 14, and thus pulsate at shorter cycles.

Thus, rotor 21 can rotate by efficiently recovering lost energy caused by space harmonic superimposed on the fundamental because magnetic flux linking induction coil 37 situated between the adjacent two rotor teeth 22 varies to effectively generate induced current. Similarly, rotor 21 can rotate by efficiently recovering lost energy caused by space harmonic superimposed on the fundamental because magnetic flux linking induction coil 27 situated between the adjacent two auxiliary salient structures 32 varies to effectively generate induced current.

Moreover, in motor 10, using the ratio P/S=2/3, where P is the number of rotor teeth salient structures and S is the number of stator slots as a configuration to determine the quality of a relative magnetic action between rotor 21 and stator 11 is to realize rotation with electromagnetic vibration suppressed and electromagnetic noise lowered.

Describing in details, since conducting magnetic field analysis of magnetic flux density distribution, as before mentioned, indicates that the magnetic flux density distribution is dispersed in a circumferential direction within a range of 360 degrees in mechanical angle according to the ratio P/S, uneven distribution of magnetic force acting on stator 11 is recognized.

Meanwhile, rotor 10 is configured to meet the ratio P/S=2/3 by having 8 rotor teeth and 12 stator slots to provide high quality rotation of rotor 21 within stator 11 by allowing interlinkage of magnetic flux with even density distribution over the entire circumference of 360 degrees in mechanical angle.

This enables motor 10 to rotate with electromagnetic vibrations considerably lowered and superior in silence by carrying out rotation using space harmonic magnetic flux without leaving it as a loss and by effectively recovering the lost energy.

In this manner, in the present embodiment, rotor teeth 22 and auxiliary salient structures 32 are provided in a way that peripheral surfaces 22a, 32a face inner peripheral surface 12a of stator 11, and induction coils 27, 37 are arranged on both of one of rotor teeth 22 and the adjacent one of auxiliary salient structures 32 at portions near their outer peripheral surfaces 22a, 32a, while electromagnetic coils 38, 28 arranged on the both of the rotor tooth 22 and the adjacent auxiliary salient structure 32 at portions near the axis of rotation or the rotating shaft.

With this motor configuration, motor 10 allows space harmonic superimposed on magnetic flux generated by armature pole coils 14 of stator 11 to link not only outer peripheral surface 22a of rotor tooth 22 on the d-axis but also outer peripheral surface 32a of auxiliary salient structure 32 on the q-axis. For this reason, motor 10 causes each of induction coils 27, 37 to generate induced current, supplying the induced current from each as field current to the associated one of electromagnetic coils 38, 28, thus making the rotor tooth 22 and the associated auxiliary salient structure 32 to serve as electromagnets to produce magnet torque.

Moreover, this motor 10 makes rectifier circuit 30 including diodes 29A, 29B and rectifier circuit 40 including diodes 39A, 39B as distinct and individual circuit configurations to provide an arrangement in which induced currents generated by induction coils 27, 37 are full-wave rectified by rectifier circuits 30, 40, respectively, to supply the rectified currents to electromagnetic coils 38, 28 to make them to serve as electromagnets.

With the circuit configurations, motor 10 provides separate rectifier circuits 30, 40, one including induction coil 27 and the associated electromagnetic coil 38, the other including induction coil 37 and the associated electromagnetic coil 28. This enables the motor 10 to produce a torque capable of providing high quality rotation with lowered variations with time by performing processing to generate electromagnetic force after full-wave rectification of induced current to give DC field current, without any mutual interference, separately to provide efficient processing and by using the DC field current.

Therefore, motor 10 can produce increased torque for rotating rotor 21 by increasing electromagnetic force with increased induction current because not only rotor teeth 22 but also auxiliary salient structures 32 work to generate induced currents and are made to effectively serve as electromagnets. At this time, torque to rotate rotor 21 is made to act in the tangential direction of each of the outer peripheral surfaces 22a, 32a by dispersing torque generating surface with the outer peripheral surfaces 22a, 33a, causing rotation in steady state without pulsation of rotor 21.

As a result, it is possible to provide motor 10, with electromagnets having self-excitation type wound field function, to effectively produce high torque drive by effectively recovering lost energy as field energy.

As a first modification of the present embodiment, motor 10 may be made in the form of an axial gap configuration in which stator and rotor face each other, although not shown, rather than the radial gap configuration.

As a second modification of the present invention, an outer rotor may be concentrically and rotatably disposed between stator 11 and rotor 21 with a gap, although not shown. A double rotor configuration may be provided by arranging magnetic elements allowing magnetic flux linking stator 11 and rotor 21 to pass therethrough and non-magnetic elements preventing the magnetic flux from passing stator 11 and rotor 21 within this outer rotor in the circumferential direction.

Although embodiments of the present invention have been described, it will be apparent to person skilled in the art that modifications may be made without departing from the scope of the present invention. All such modifications and equivalents thereof are intended to be covered by the following claims described in scope of claims.

DESCRIPTION OF SIGNS

10 Motor,
11 Stator,
12 Stator teeth,
12a Inner peripheral surface,
13 Stator slot,
14 Armature pole coil,
21 Rotor,
22 Rotor teeth,
22a, 32a Outer peripheral surface (End face),
23 Rotor slot,
27, 27A1-27An, 27B1-27Bn, 37, 37A1-37An, 37B1-37Bn Induction coil,
28, 28A1-28An, 28B1-28Bn, 38, 38A1-38An, 38B1-38Bn Electromagnetic coil,
29A, 29B, 39A, 39B Diode,
30 Rectifier circuit (First rectifier circuit),
32 Auxiliary salient structure,
40 Rectifier circuit (Second rectifier circuit),
FL Flux line,
G Air gap,
V Magnetic flux vector.

The invention claimed is:

1. A motor comprising:
   a stator including a plurality of armature pole coils for generation of magnetic flux when energized,
   a rotor mounted for rotation within the stator owing to the magnetic flux,
   the rotor being formed with a plurality of main salient structures, which are directed toward the stator and distant one after another in a predetermined direction, and a plurality of auxiliary salient structures, which are directed toward the stator and distant one after another in the predetermined direction in a way that each of the plurality of auxiliary salient structures is situated between the adjacent two of the plurality of main salient structures,
   the plurality of main and auxiliary salient structures including induction coils, each for generation of induced current when linked by space harmonics contained in the magnetic flux, and electromagnetic coils, each for generation of electromagnetic force when energized by the induced current generated by the induction coil;
   a first rectifier circuit to which the induction coils which are arranged on the main salient structures and the electromagnetic coils which are arranged on the auxiliary salient structures are connected;
   a second rectifier circuit to which the induction coils which are arranged on the auxiliary salient structures and the electromagnetic coils which are arranged on the main salient structures are connected;
   each of the first and second rectifier circuits configured to rectify the induced current generated by the induction coil to energize the electromagnetic coil with DC field current from the rectifier circuit; and
   wherein the first and second rectifier circuits are electrically independent circuit configurations, respectively.

2. The motor as claimed in claim 1, wherein
   each of the plurality main salient structures is formed in a way that space harmonics superimposed on that magnetic flux which is generated on the adjacent one of d-axis magnetic paths link the main salient structure from its end facing the stator; and
   each of the plurality auxiliary salient structures is formed in a way that space harmonics superimposed on that magnetic flux which is generated on the adjacent one of q-axis magnetic paths link the auxiliary salient structure from its end facing the stator.

3. The motor as claimed in claim 2, wherein
   the induction coils are arranged on the main and auxiliary salient structures, respectively, at portions near their ends; and
   the electromagnetic coils are arranged on the main and auxiliary salient structures, respectively, at portions near the axis of rotation of the rotor and remote from their ends.

4. The motor as claimed in claim 1, wherein the first and second rectifier circuits are full-wave rectifier circuits, respectively.

* * * * *